April 28, 1925.

L. JANISCH 1,536,009

ELECTROPNEUMATIC CONTROL SYSTEM

Filed May 12, 1923

Inventor:
Leopold Janisch,
by Alexander S. Lunt
His Attorney.

Patented Apr. 28, 1925.

1,536,009

UNITED STATES PATENT OFFICE.

LEOPOLD JANISCH, OF BERLIN, GERMANY, ASSIGNOR TO GENERAL ELECTRIC COMPANY, A CORPORATION OF NEW YORK.

ELECTROPNEUMATIC CONTROL SYSTEM.

Application filed May 12, 1923. Serial No. 638,616.

*To all whom it may concern:*

Be it known that I, LEOPOLD JANISCH, a citizen of the German Realm, residing at Berlin, Germany, have invented certain new and useful Improvements in Electropneumatic Control Systems, of which the following is a specification.

One of the objects of the invention is to provide an improved electropneumatic control system for electric vehicle motors, whereby a train of vehicles of electrically operated cars may all be effectively controlled from one operator's station or platform.

Another object is to provide an arrangement wherein the cars or electric vehicles may all be controlled by one operator regardless of the number of the cars and their arrangement in the train.

Another object is the provision of an arrangement involving the use of a pneumatically operated, electrically controlled cam shaft which controls switches for effecting the acceleration and protection of the vehicle motors, the arrangement being such that the cam shafts of the respective vehicles may all be controlled from the foremost driver's platform.

A further object is the provision of a main valve in the supply pipe for the electropneumatic switch mechanism of each vehicle, which is under the control of the operator and which is arranged so as to be also automatically operated in response to predetermined operating conditions so as to automatically protect the vehicle motors.

A still further object of the invention is the provision of a trailing controller which is operated by the main master controller so as to obtain "notching up" or "notching down" control of the vehicle motors.

Figure 1:
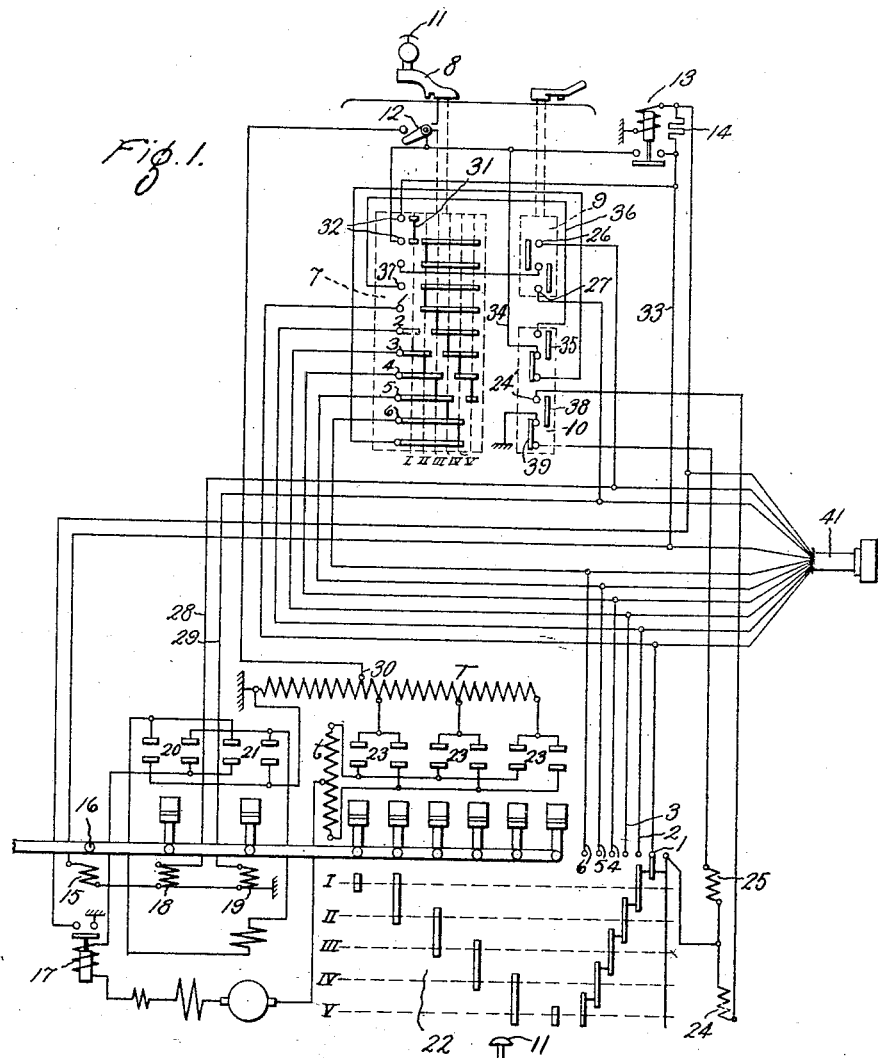
Figure 4:
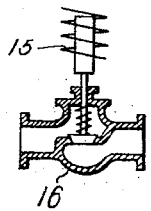
Figure 2:
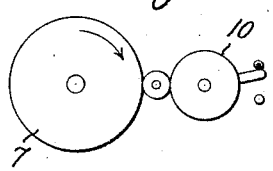
Figure 3:
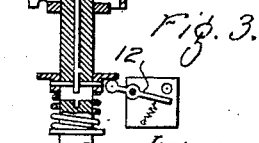

In the accompanying drawings, Fig. 1 is a very diagrammatic representation of a system of motor control in accordance with the invention, Fig. 2 is a very simplified diagram of the manner in which the trailing cylinder is controlled by the main contact cylinder or master switch so as to determine the operation of the motor controlling switches to increase or decrease the motor speed, Figure 3 is a detail of the construction of the master controller whereby depressing the button on the controller handle will operate an auxiliary switch so as to control the fluid operated motor controlling switches of the system, and Figure 4 is a detail of the main valve in the supply pipe for the electropneumatic switch mechanism of each vehicle.

Referring to the drawings, the main controller or master switch 7 is arranged to be operated by means of the crank or handle 8, and the reversing switch 9 is intended to be operated by the handle shown for that purpose. The trailing cylinder 10 is arranged to be operated by the main cylinder 7, and this trailing cylinder is intended to control motor controlling switches so as to regulate the increase or decrease of the speed of the motor or motors controlled by means of my control system. The trailing cylinder 10 is shown in a positon which corresponds to the backward direction of travel of the vehicle, and this cylinder is arranged to be moved into the position for the forward direction of vehicle operation by the initial movement of the handle 8 of the main master switch from the neutral position, that shown on the drawing. By reference to Fig. 2, it will be seen that the trailing cylinder 10 is given a limited corresponding movement by the initial movement of the main cylinder 7 in either direction, and then further movement is arrested. A push button 11 is arranged on the handle 8, and this push button controls the auxiliary independently operable switch 12.

The relay 13 is connected in the control circuit for the coil 15 of the valve 16 which is included in the conduit which supplies fluid under pressure for the operation of main motor controlling switches. Overload protection is provided by means of the overload relay 17. Coils 18 and 19 serve for the control of respective valves for controlling the operation of the fluid operated reversing contactors 20 and 21. These coils 18 and 19 are respectively energized through the contact fingers 26 and 27 of the reverser 9 through the conductors 28 and 29 respectively.

I have shown my invention in connection with the control of an alternating current motor of the commutator type which is supplied with energy from the secondary of a transformer T, the primary of which is not shown, since that would add nothing to an understanding of the invention. The arrangement is such that fluid operated motor controlling switches or contactors 23 are provided for connecting to various taps on the secondary of the transformer T, and the loading coil, reactance, or other potential reducing device (*t*) is used for obtaining a smoother increase or decrease of the motor speed than would be possible by merely varying the taps of the secondary of the transformer T. The controlling valves of the motor controlling contactors 23 are all controlled by the cam cylinder 22, and the control conductors connecting the main master switch 7 and the cam cylinder 22 are designated by the numerals 1 to 6 inclusive. The electromagnet 24 is provided for controlling the operating mechanism for the cam cylinder 22 so as to rotate the same in such a direction as to increase the motor speed, and the coil 25 is provided for controlling the same so as to effect a decrease of the motor speed. The coils 24 and 25 may be used for the control of valves of a fluid operated mechanism for operating the cylinder 22, or these coils may be used for controlling the operation of any suitable mechanism for operating the cylinder 22 through its successive operating positions. The positions of the main master switch 7 and the cam cylinder 22 are designated by the numerals, I, II, III, IV and V.

As thus constructed and arranged, the operation of my invention is as follows: After the cylinder 9 which controls the direction of travel has been thrown to the position corresponding to the direction desired (forward, for example), the handle 8 of the main master switch may be moved clockwise after the button 11 has been depressed and the auxiliary switch 12 connected therewith has been closed. Before the master switch 7 has reached the position I, the contacts 32 are closed through the segment 31, so that the relay 13 is energized to close. After the relay 13 closes, it establishes a maintaining circuit for itself through its contacts, and the relay 13 closes a circuit which energizes the coil 15 of the valve 16 in the supply conduit for the main motor controlling switches. The circuit for the coil of the relay 13 is as follows: From the transformer tap 30, contacts of auxiliary switch 12, contacts 32 of the main master switch 7, resistance 14, coil 13 to ground. After the relay 13 closes, the master switch 7 may be moved from its neutral position, while maintaining the button 11 depressed, for the reason that the relay establishes a maintaining circuit for its coil which is independent of the contacts 32 of the master switch 7. As before stated, the closing of relay 13 energizes the coil 15 through the conductor 33 so that the valve 16 will be operated to open the fluid supply pipe to the valves of the contactors 23. Since the trailing cylinder 10 has in the meantime brought its segments into engagement with the associated contact fingers, the right hand upper segment of the main cylinder 7 is connected in circuit through the conductor 34, segment 35 of the trailing cylinder 10, conductor 36, and contact finger 37. If the cam cylinder 22 is now rotated, for example, to position III, through the energization of the "on" magnet 24, by reason of the fact that the master switch 7 had previously been thrown to the position corresponding to III, the conductors 1, 2 and 3 are energized, and the coil 24 is connected to ground through the contact finger 24' and the segment 38 of the trailing cylinder 10. The coil 24 will be maintained energized until the contact finger 3 slides from engagement with its respective segment of the main cylinder 22 in position III of the cylinder 22. It will be understood that the main cylinder 22 may be operated to any position desired under the control of the main master switch 7, in accordance with the desires of the operator.

Assume that the main cylinder 22 is in the III position, as previously explained, and the overload relay 17 should automatically operate so as to substantially deenergize the coil of the relay 13, or suppose there should be a failure of voltage or some other abnormal motor operating condition, the relay 13 will be caused to open and thus deenergize the coil 15 of the valve 16 in the main supply conduit for the main motor controlling switches. The valve 16 in opening will close the air supply pipe to the valves of the contactors 20, 21 and 23 to the supply of the motive fluid and connect these contactors to exhaust, so that these contactors will automatically open. In order to reclose the contactors, it will be necessary to return the main master switch 7 to the neutral or off position so as to be able to energize the relay 13 through the segment 31 of the master switch 7. By maintaining the button 11 and the handle 8 depressed, the off magnet 25 will be energized through the segment 39 of the trailing cylinder, which will be thrown to the position shown in the drawing by a relatively minor return movement of the handle 8 of the main master switch 7. A circuit is established through the contact segments of the main cylinder 22 for the energization of the off magnet valve 25 through the conductor 34, so that as long as the auxiliary switch 12 is maintained closed, the magnet 25 will receive energy from the transformer tap 30 to return the main cylinder to the off position. It is thus possible to "notch up" or "notch down" to regulate the speed of the motors and predetermine the position of the cam cylinder 22 after the occurrence of an abnormal circuit condition. However, it will be understood that in order to again energize the relay 13, the master switch 7 must be returned to the neutral position so as to thereby close the valve 16 and effect the operation of the main switches 20, 21 and 23. It will be observed that by establishing multiple connections through the cable indicated at 41, it will be possible to control all of the cars or vehicles of a train from the single controller located at one driver's platform. By this multiple connection, in case any abnormal circuit condition should occur in the motor circuits or any one of the cars of a train, relays 13 of all of the cars will be deenergized and automatically opened so that it will be necessary to return the main master controller 7 to the off position in order to connect the respective vehicle motors to the source of supply.

In accordance with the provision of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Leters Patent of the United States, is:

1. A system of motor control comprising electrically controlled fluid operated motor controlling switch mechanism, a master switch having an auxiliary independently operable switch associated therewith for controlling the said switch mechanism, a main supply conduit for the operating fluid for the said switch mechanism, a magnetically controlled valve in the said conduit under the control of the said master switch, and connections whereby the said master switch must be returned to the neutral position to place the said valve under the control of the said auxiliary switch.

2. A system of motor control comprising electrically controlled fluid operated motor controlling switch mechanism, a master switch having a neutral and a plurality of operative positions for controlling the said switch mechanism, a main supply conduit for the operating fluid for the said switch mechanism, a magnetically controlled valve in the said conduit under the control of the said master switch for controlling the supply of operating fluid for the said switch mechanism, means responsive to abnormal motor operating conditions for automatically controlling the said valve independently of the said master switch, and connections whereby the master switch must be returned to the neutral position to obtain control of the said valve after the operation of the said automatic means.

3. A system of motor control comprising electrically controlled fluid operated motor controlling switch mechanism, a master switch having an auxiliary independently operable switch associated therewith for controlling the said switch mechanism, a main supply conduit for the operating fluid for the said switch mechanism, a magnetically controlled valve in the said conduit under the control of the said master switch, means responsive to abnormal motor operating conditions for automatically controlling the said valve independently of the said master switch, and connections whereby the said master switch must be returned to the neutral position to place the said valve under the control of the said auxiliary switch.

4. A system of motor control comprising a plurality of successively operated electrically controlled motor operating switches, a main master switch for controlling the same, an auxiliary master switch operated by the said main master switch for controlling the said switches, and connections whereby a movement in either direction of the said main master switch operates the said auxiliary master switch and determines the operation of the said motor controlling switches to increase or decrease the motor speed.

In witness whereof, I have hereunto set my hand this 27th day of April, 1923.

LEOPOLD JANISCH.